INVENTORS
MOTOO SHIBATA,
EIJI HIGASHIDE,
KOZUNORI HATANO,
KOMEI MIZUNO,
MITSUKO ASAI and
MASAYUKI MUROI, Inventors

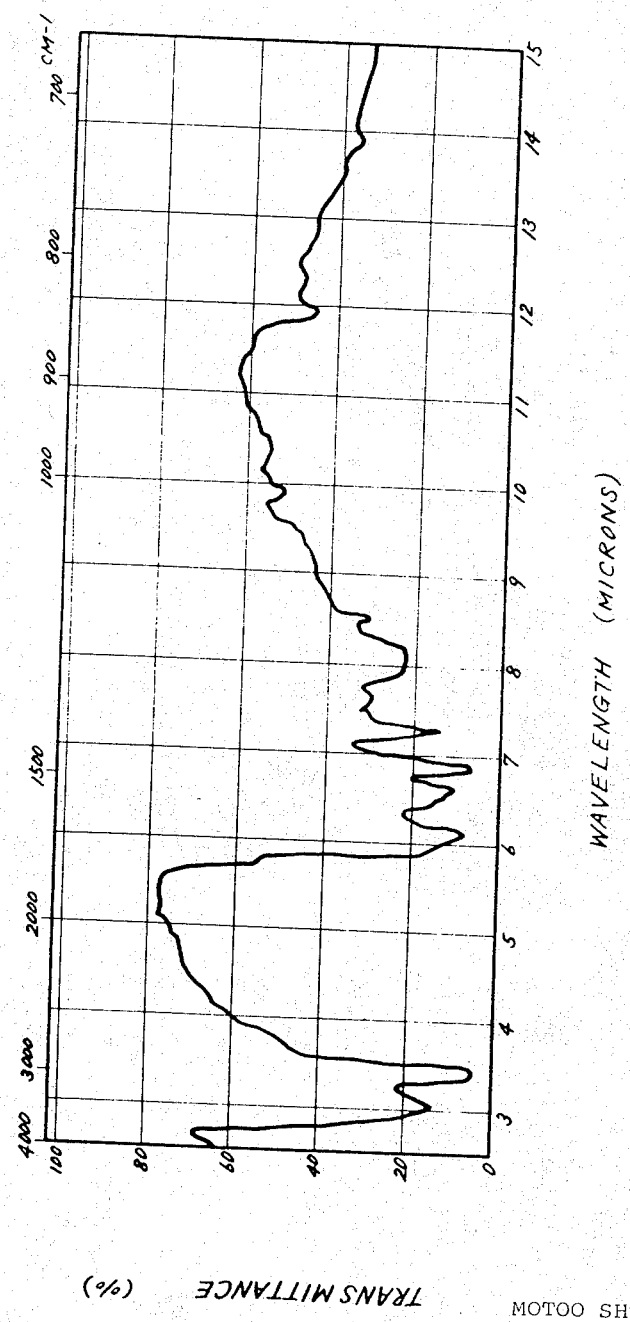

3,786,142
ANTIBIOTIC ENDURACIDIN AND PROCESS
FOR THE PRODUCTION THEREOF
Motoo Shibata, Toyonaka, Eiji Higashide, Takarazuka, Kazunori Hatano and Komei Mizuno, Suita, Mitsuko Asai, Takatsuki, and Masayuki Muroi, Suita, Japan, assignors to Takeda Chemical Industries, Ltd., Osaka, Japan
Continuation-in-part of abandoned application Ser. No. 586,483, Oct. 13, 1966. This application Oct. 15, 1969, Ser. No. 866,636
Claims priority, application Japan, Oct. 13, 1965, 40/62,849; Oct. 26, 1965, 40/65,884
Int. Cl. A61k 21/00
U.S. Cl. 424—118
5 Claims

ABSTRACT OF THE DISCLOSURE

Enduracidin (prepared from a strain of Streptomyces in a nutrient medium) and Enduracidin hydrochloride are antibiotics useful in combating septic conditions in vitro and certain pathological disorders in vivo. Enduracidin exhibits strong antimicrobial activity against Gram-positive bacteria and acid fast bacteria.

---

Figure 1:
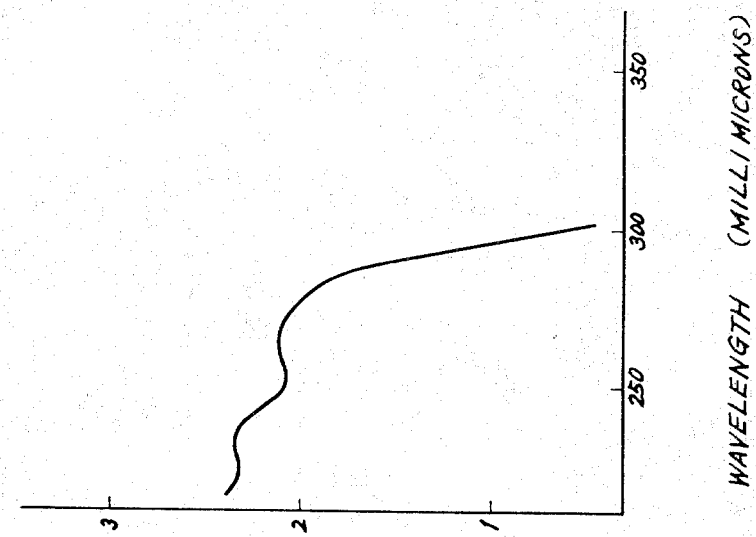

This application is a continuation-in-part of application Ser. No. 586,483, filed Oct. 13, 1966, now abandoned.

This invention relates to a new antibiotic and to its microbiological production.

The invention is based on the observations:

(1) That there exist microorganisms capable of producing the new antibiotic;

(2) That the microorganisms capable of producing the antibiotic belong to the genus Streptomyces;

(3) That the antibiotic is accumulated when the microorganisms are cultured;

(4) That the so-accumulated antibiotic can be recovered in a desired purity from the culture broth, taking advantage of the differential physicochemical properties of the antibiotic and of the culture broth; and (5) That the antibiotic has strong antimicrobial activity against both Gram-positive bacteria and acid-fast bacteria.

The new antibiotic has been named Enduracidin."

In the method of the present invention, microorganisms which belong to the genus Streptomyces and can produce Enduracidin are employed.

These microorganisms comprise for example a variant of *Streptomyces fungicidicus*, *Streptomyces fungicidicus* No. B–5477 IFO–12439 (ATCC—21013) which has been isolated from the soil at Nishinomiya, Japan, and named as above by the present inventors.

The microbial characteristics of *Streptomyces fungicidicus* No. B–5477 (ATCC–21013) are as follows:

In the following characteristics, the color names designated as "Rdg." are based on Ridgway's Color Standard and Nomenclature.

(A) Morphological charactertistics:
Sporophores form spiral.
Spores show an oval, $0.9\mu$ x $1.6$–$1.1\mu$.
The surface of spores is spiny.

(B) Cultural characteristics:
(1) Czapek's agar:
Vegetative mycelium (hereinafter abbreviated as VM): Abundant, spreading, penetrate into the medium, colorless.
Aerial mycelium (hereinafter abbreviated as AM): Abundant, powdery, Quaker Drab (Rdg. LI, 1′′′′′′).
Reverse (hereinafter abbreviated as R): Warm Buff (Rdg. XV, 17′–d).
Soluble pigment (hereinafter abbreviated as SP): None.

(2) Glucose Czapek's agar:
VM: Abundant, spreading, colorless.
AM: Abundant, powdery, Pale Quaker Drab (Rdg. XI, 1′′′′′′–d).
R: Warm Buff.
SP: None or faint yellow.

(3) Glycerine Czapek's agar:
VM: Abundant, folded, colorless.
AM: Abundant, Deep Olive Gray (Rdg. LI, 23′′′′′′), becoming Light Mouse Gray (Rdg. LI, 15′′′′′′–b) to Light Quaker Drab (Rdg. LI, 1′′′′′′–b).
R: Warm Buff.
SP: None or faint yellow.

(4) Glucose asparagine agar:
VM: Abundant, spreading, colorless.
AM: Abundant, Light Olive Gray (Rdg. LI, 23′′′′′′–d) to Pale Quaker Drab (Rdg. LI, 1′′′′′′–d) or sometimes poor, white.
R: Cream Color (Rdg. XVI, 19′–f) or colorless.
SP: None.

(5) Bouillon broth:
VM: Abundant, floating on the surface of the medium and a few colorless mycelia sink to the bottom.
AM: Abundant, white. Transparent medium and no soluble pigment.

(6) Bouillon agar:
VM: Abundant, spreading, colorless.
AM: Moderate, white to Pale Quaker Drab.
R: Warm Buff (Rdg. XV, 17′–d).
SP: None.

(7) Glucose bouillon agar:
VM: Abundant, folded, spreading, colorless.
AM: Abundant, Deep Quaker Drab (Rdg. LI, 1′′′′′′–i).
R: Yellow Ocher (Rdg. XV. 17′).
SP: Faint brown or none.

(8) Glycerine bouillon agar:
VM: Abundant, spreading, colorless.
AM: Abundant, powdery, Quaker Drab to Deep Quaker Drab.
R: Isabella Color (Rdg. XXX, 19″–i).
SP: None or faint brown.

(9) Starch agar:
VM: Abundant, spreading, colorless.
AM: Abundant, Light Quaker Drab (Rdg. LI, 1′′′′′′–b), becoming Quaker Drab.
R: Light Buff (Rdg. XV. 17′–f).
SP: None.

(10) Egg:
VM: Abundant, spreading, wrinkled.
AM: Moderate, white to white with yellowish tinge and sometimes poor, white. The color of the medium changes to grayish white to brown.

(11) Yeast extract agar:
 VM: Abundant, wrinkled, spreading, colorless.
 AM: Abundant, powdery, Light Mouse Gray (Rdg. LI, 15'''''-b) to Quaker Drab.
 R: Isabella Color.
 SP: None.

(12) Potato plug:
 VM: Abundant, spreading, raised up, colorless.
 AM: Abundant, Quaker Drab. The color of the medium changes to dark brown after 3 weeks.

(13) Milk:
 VM: Abundant, folded, floating on the surface of the medium, colorless.
 AM: Abundant, white to Pearl Gray (Rdg. LII, 35'''''-f). Strong peptonization without coagulation.

(14) Carrot plug:
 VM: Abundant, spreading, rasied up, colorless.
 AM: Abundant, Quaker Drab (Rdg. LI, 1''''''). The color of plug changes to Buchthorn Brown (Rdg. XV, 17'-f).

(15) Gelatin:
 VM: Poor.
 AM: Poor, white, slow liquefaction.

(16) Nutrient gelatin:
 VM: Abundant.
 AM: Abundant, white, rapid liquefaction.
 SP: None.

(17) Nitrate reduction in Czapek's solution (containing NaNO₃ 0.1%): Positive.

(18) Cellulose:
 VM: Abundant, spreading, colorless.
 AM: Abundant, Quaker Drab (Rdg. LI, 1''''''). No decomposition.

(19) Calcium malate agar:
 VM: Abundant, spreading, thin, colorless.
 AM: Moderate, Pallid Quaker Drab (Rdg. LI, 1'''''-d) to Pallid Mouse Gray (Rdg. LI, 15'''''-f).
 R: Naples Yellow (Rdg. XVI, 19'-d).
 SP: None or faint yellow.

(20) Tyrosine agar:
 VM: Poor, thin, spreading, colorless.
 AM: None.
 R: Colorless.
 SP: None.

(21) Peptone agar:
 VM: Abundant, spreading, flat, colorless.
 AM: Poor, Drab Gray (Rdg. XLVI, 17'''''-b).
 R: Faint Cream Color (Rdg. XVI, 19'-f).
 SP: None.

(22) Starch casein agar:
 VM: Abundant, spreading, flat, colorless.
 AM: Abundant, velvety, Deep Mouse Gray (Rdg. LI, 15'''''-i).
 R: Light Oliver Gray (Rdg. LI, 23'''''-d).
 SP: None.

(23) Maltose tryptone agar:
 (VM: Abundant, spreading, flat, colorless.
 AM: Abundant, Mouse Gray (Rdg. LI, 15''''') to Quaker Drab (Rdg. LI, 1'''''').
 R: Light Buff (Rdg. XV, 17'-f).
 SP: None or faint yellow.

(24) Bennett's agar:
 VM: Abundant, spreading, flat, thin, colorless.
 AM: Abundant Quaker Drab to Deep Quaker Drab (Rdg. LI, 1'''''-i).
 R: Colorless to Warm Buff (Rdg. XV, 17'-d).
 SP: None.

(25) Starch hydrolysis:
 Hydrolysis, enzymatic zone/growth zone=30 mm./10 mm. to 28 mm./10 mm.

(C) Utilization of carbon sources observed by the Pridham-Gottlieb method:

| | | | |
|---|---|---|---|
| Erythritol | ± | Melibiose | ++ |
| Adonitol | ± | Maltose | +++ |
| D-sorbitol | + | Sucrose | + |
| L-inositol | +++ | Lactose | +++ |
| D-mannitol | +++ | Raffinose | + |
| Dulcitol | + | Trehalose | +++ |
| D-xylose | +++ | Salicin | +++ |
| L-arabinose | +++ | Aesculin | + |
| L-sorbose | + | Inulin | ± |
| D-galactose | +++ | Dextran | +++ |
| D-glucose | +++ | Sodium acetate | ++ |
| D-fructose | +++ | Sodium succinate | + |
| D-mannose | ++ | Sodium citrate | + |
| Rhamnose | +++ | Control | ± |

Remarks.—+++: abundant growth; ++: good growth; +: fair growth; ±: faint growth.

Comparison of the above-mentioned morphological and cultural characteristics with the description in "The Actinomyces, vol. II" written by S. A. Waksman, published by The Williams and Wilkins Company in 1961, shows that the strain usable in the present invention is similar in morphological characteristics of Streptomyces fungicidicus in such points that sporophores form spiral, the surface of spores is spiny, aerial mycelium color is gray, no soluble pigment is produced, and that the strain is of the non-chromogenic type.

But there are differences in cultural characteristics of the strain from those of Streptomyces fungicidicus.

More specifically, Streptomyces fungicidicus produces pink soluble pigment when cultured on calcium malate agar and weakly coagulates and peptonizes milk.

On the contrary, the present strain does not produce such soluble pigment or if it does produce soluble pigment, the latter is pale yellow, and it does not coagulate milk but peptonizes the milk so strongly that the peptonization is completed within one week. Further, the present strain utilizes fructose and salicin, which are not utilized by Streptomyces fungicidicus.

Additionally, Streptomyces fungicidicus forms Fungicidin which is a fungicidal substance, while the present strain does not form such fungicidal substance in the culture broth nor in mycelia.

From the above-mentioned properties of the present strain, it is classified by the inventors as a strain of Streptomyces fungicidicus and named Streptomyces fungicidicus No. B-5477.

A specimen of Streptomyces fungicidicus No. B-5477 is on deposit at American Type Culture Collection, Rockville, Md., U.S.A., under the accession number ATCC-21013.

The antibacterial spectrum observed by the cross streak method of Streptomyces fungicidicus No. B-5477 on bouillon agar and glycerine bouillon agar is shown in Table 1. Streptomyces fungicidicus No. B-5477 was streaked on agar plates and incubated at 28° C. for 4 days. The plates were then cross-streaked with test organisms shown in Table 1 and were further incubated at

TABLE 1

[Antibacterial spectrum of Streptomyces fungicidicus No. B-5477 by cross-streaked method]

| | Inhibitory zone (mm.) | | | |
|---|---|---|---|---|
| | Bouillon agar | | Glycerine bouillon agar | |
| Escherichia coli | 0 | 0 | 0 | 0 |
| Proteus vulgaris | 0 | 0 | 0 | 0 |
| Staphylococcus aureus | 0 | 0 | 12 | 12 |
| Bacillus subtilis | 0 | 0 | 12 | 12 |
| Bacillus cereus | 0 | 0 | 0 | 0 |
| Bacillus brevis | 0 | 0 | 0 | 0 |
| Sarcina lutea | 0 | 0 | 0 | 0 |
| Micrococcus flavcus | 0 | 0 | 0 | 0 |
| Mycobacterium avium | 0 | 0 | 0 | 0 |

37° C. for 20 hours when Gram-positive bacteria and Gram-negative bacteria are used, and for 40 hours when acid-fast bacteria are used.

Finally, the inhibition length for each test organism was measured.

Table 1 shows that *Streptomyces fungicidicus* No. B–5477 produces antibiotic substances active mainly against Gram-positive bacteria and acid-fast bacteria.

The microbial characteristics of actinomycetes, especially of the genus Streptomyces, are not generally fixed and this applies also to the characteristics of the Enduracidin-producing-strains.

Therefore, there are many mutants and variants of *Streptomyces fungicidicus* No. B–5477.

Among the mutants and variants of *Streptomyces fungicidicus*, regardless of whether the variation may be caused naturally or artificially, for example, by X-ray treatment, ultraviolet-ray treatment or by the action of chemical reagents, any one which can produce Enduracidin can be employed in the method of the present invention.

For example, after screening out the wild strain with high potency, a mutant thereof is obtained by ultraviolet-ray irradiation, γ-ray irradiation or monospore culture. The mutant forms spiral sporophores and the spore surface is spiny, the same as the original strain.

The microbial characteristics of the mutant (IFO–12440) (ATCC–21014) of *Streptomyces fungicidicus* No. B–5477 are as follows:

(A) Morphological characteristics.—Same as wild strain.

(B) Cultural characteristics.—The mutant produces colorless or yellow vegetative mycelia on various media, and Massicot Yellow (Rdg. XVI, 21′–f) or Mustard Yellow (Rdg. XVI, 19′–b) aerial mycelia.

The present mutant does not produce soluble pigment on most culture media, but it occasionally produces pale yellow soluble pigment.

(1) Czapek's agar:
  Vegetative mycelium (VM): Abundant, spreading, penetrate into the medium, pale yellow.
  Aerial mycelium (AM): Abundant, powdery, Cream Color (Rdg., XVI, 19′–f) to Pale Ochraceous Buff Rdg. XV, 15′–f).
  Reverse (R): Cream Color.
  Soluble pigment (SP): None or faint yellow.

(2) Glucose Czapek's agar:
  (VM): Abundant, spreading, colorless to faint yellow.
  (AM): Moderate, powdery, white to Naples Yellow (Rdg. XVI, 19′–d).
  (R): Cream Color to Mustard Yellow (Rdg. XVI, 19′–b).
  (SP): None.

(3) Glycerine Czapek's agar:
  (VM): Abundant, spreading, folded, Mustard Yellow.
  (AM): Abundant, powdery, Cream Color to Naples Yellow.
  (R): Light Ochraceous Buff (Rdg. XV, 15′–d) to Ochraceous-Buff (Rdg. XV, 15′–b).
  (SP): Pale Yellow.

(4) Glucose asparagine agar:
  (VM): Colorless to Mustard Yellow, spreading.
  (AM): Moderate, velvety, Massicot Yellow (Rdg. XVI, 21′–f) to Mustard Yellow.
  (R): Yellow.
  (SP): None.

(5) Bouillon agar:
  (VM): Moderate, spreading, colorless.
  (AM): Moderate, powdery, white.
  (R): Colorless.
  (SP): None.

(6) Glucose bouillon agar:
  (VM): Abundant, spreading, colorless, wrinkled.
  (AM): Moderate, powdery, white to Cream Color.
  (R): Pale brown.
  (SP): None.

(7) Glycerine bouillon agar:
  (VM): Abundant, spreading, colorless, wrinkled.
  (AM): Moderate, powdery, white.
  (R): Pale brown.
  (SP): None.

(8) Starch agar:
  (VM): Abundant, spreading, Mustard Yellow, penetrated into the medium.
  (AM): Abundant, powdery, Pale Ochraceous Buff (Rdg. XV, 15′–f) to Cream Color.
  (R): Naples Yellow to Light Ochraceous-Salmon (Rdg. XV, 13′–d).
  (SP): None or faint yellow.

(9) Whole egg medium:
  (VM): Moderate, spreading, Naples Yellow.
  (AM): None or very scant, white to Cream Color. The color of the medium does not change.

(10) Löffler's medium:
  (VM): Abundant, colorless, wrinkled.
  (AM): None.
  (SP): None, Strong liquefaction.

(11) Yeast extract agar:
  (VM): Abundant, spreading, wrinkled, colorless to faint brown.
  (AM): Abundant, powdery, Cream Color to Naples Yellow.
  (R): Antimony Yellow (Rdg. XV, 17′–b) to Light Ochraceous-Salmon.
  (SP): None.

(12) Potato plug:
  (VM): Abundant, spreading, wrinkled, Antimony Yellow (Rdg. XV, 17′–b).
  (AM): Abundant, powdery, white to Light Ochraceous-Buff. The color of the medium becomes brown.

(13) Carrot plug:
  (VM): Abundant, wrinkled, Ochraceous-Buff.
  (AM): At first white, later Pale Ochraceous-Buff to Light Ochraceous-Salmon. The color of the medium does not change.

(14) Bouillon:
  (VM): Scant, sinks to the bottom and abundant growth floating on the surface of the medium, colorless to Pale brown.
  (AM): Moderate, powdery, white.
  (SP): None.

(15) Glucose bouillon, Glycerine bouillon: Same as on bouillon, but growth is more abundant and wrinkled.

(16) Litmus milk:
  (VM): Abundant growth, Mustard Yellow, floating on the surface of the medium and ring-form growth, wrinkled.
  (AM): Scant, white, peptonization strong without coagulation.

(17) Nutrient gelatin:
  (VM): Abundant, ring form on the edge of the tube, wrinkled, Ochraceous-Buff.
  (AM): Moderate, white to Cream Color. No soluble pigment. Strong liquefaction.

(18) Czapek's solution with 0.2% NaNo₃:
  (VM): Moderate, floating on the surface of the medium, colorless.
  (AM): Moderate, powdery, white.
  (SP): None. Nitrate reduction weakly.

(19) Cellulose:
  (VM): Moderately, colorless to Cream Color, spreading.
  (AM): Moderate, powdery, white to Pale Ochraceous-Salmon.

(20) Calcium malate agar:
  (VM): Moderate, colorless to cream color to Ochraceous-Buff spreading.

(AM): Moderate, powdery, white to Pale Ochraceous-Salmon.
(R): Cream Color to Light Ochraceous-Salmon.
(SP): None.
(21) Tyrosine agar:
(VM): Scant, thin, colorless.
(AM): None.
(R): Colorless.
(SP): None.
(22) Peptone agar:
(VM): Moderate, spreading, colorless.
(AM): Moderate, powdery, white to Pale Ochraceous-Buff (Rdg. XV, 15′–f).
(R): Colorless to Cream Color.
(SP): None, non-chromogenic type.
(23) Starch hydrolysis: Enzymatic zone/growth zone = 22 mm./11 mm. to 26 mm./13 mm.

(C) Utilization of carbon sources observed by Pridham and Gottlieb method:

| | | | |
|---|---|---|---|
| Erythritol | ± | D-Maltose | +++ |
| Adonitol | ± | Sucrose | ± |
| D-sorbitol | ± | Lactose | +++ |
| i-Inositol | +++ | Raffinose | ± |
| D-mannitol | +++ | Salicin | +++ |
| Dulcitol | ± | Aesculin | + |
| D-xylose | +++ | Inulin | ± |
| L-arabinose | +++ | Sodium-acetate | ++ |
| L-sorbose | + | Sodium-succinate | ++ |
| D-galactose | +++ | Sodium-citrate | ++ |
| D-glucose | ++ | Starch | +++ |
| D-mannose | +++ | Rhamnose | +++ |
| Glycerine | +++ | Melibiose | + |
| D-fructose | +++ | | |
| | | Control | ± |

Remarks.—±: faint growth; +: growth; ++: moderate growth; +++: abundant growth.

In the method of the present invention, an Enduracidin producing strain belonging to the genus Streptomyces is incubated in a medium containing assimilable carbon sources, digestible nitrogen sources and other necessary nutrients.

As the carbon sources, for example, starch, glucose, lactose, maltose, galactose, sucrose, dextrin, glycerol or starch syrup can be employed. As the nitrogen sources, for example, peptone, soybean flour, corn steep liquor, meat extract, ammonium salt, organic or inorganic nitrogen compounds can be employed. Further, a small quantity of inorganic salts such as chloride, phosphate, salts of metals such as calcium, zinc, manganese, iron may be added to the medium. And, if necessary, conventional nutrient factors or an antifoaming agent such as animal oil, wax, vegetable oil or mineral oil may be added.

For the culture of an Enduracidin-producing strain, submerged culture or shaking culture utilizing liquid medium is preferable. But, as occasion demands, static culture may be employed. The culture conditions such as temperature, culture period and pH of the medium are determined so that the production of Enduracidin is maximum. When submerged culture is employed, the production of Enduracidin becomes maximum generally under such conditions as at 25° C. to 45° C., at around neutral pH and for about 3 to 10 days.

Enduracidin thus produced is contained mostly in the mycelia, but also in the liquid part of the culture broth.

Enduracidin thus accumulated in the culture broth is recovered and refined in a desired purity by utilizing appropriate means with adequate consideration being given to the properties of Enduracidin, for example, those using difference between Enduracidin and the impurities in solubility, in distribution coefficient between two liquid phases, in adsorbability, or in ion-coherence.

As the Enduracidin exists not only in the mycelia but also in the liquid part of the culture broth, it is preferable for recovering Enduracidin to separate at first mycelia from the culture broth and then to subject the mycelia and the liquid part of the culture broth, respectively, to a separation or purification process.

Practically, the separation or purification of Enduracidin is advantageously achieved by means of extraction with an organic solvent, and the best result is given when the extraction is carried out with n-butanol under basic conditions, followed by re-extracting with an aqueous acid solution.

The separation or purification of Enduracidin can be effected by taking advantage of such characteristics as that it is adsorbable on activated charcoal under alkaline conditions (pH of not lower than about 8.0), that it is extractable with an organic solvent (e.g. acidified aqueous acetone, aqueous methanol) and that it is not adsorbable on cation or anion exchange resins (e.g. Amberlite IR-120, Amberlite IR-45).

An advantageous example of the method for extracting Enduracidin can generally be carried out as follows:

The mycelia obtained from the culture broth are washed with water, followed by subjecting the mycelia to extraction twice under neutral or acid conditions with an organic solvent (e.g. 50 to 70% aqueous acetone in a large excess relative to the mycelia, 50 to 70% methanol, etc.) at room temperature (20 to 35° C.) for about 3 hours.

Thus-obtained filtrate contains a large amount of Enduracidin showing strong antimicrobial activity against gram-positive bacteria. After adjusting to pH 5 to 6, the filtrate is concentrated in vacuo to distil out acetone followed by adjustment with sulfuric acid to pH 3, and then ethyl acetate added in an amount of ⅓ part by volume relative to the resultant mixture, and the whole mixture is shaken to transfer the soluble part into the ethyl acetate layer. Aqueous layer (containing some precipitate) separated from the ethyl acetate layer is adjusted to pH 8 with sodium hydroxide, sodium carbonate or sodium bicarbonate, followed by extracting with ⅓ volume of n-butanol relative to the whole volume.

After the above-mentioned extraction with n-butanol is repeated several times, the n-butanol layer is washed with ½ volume of water realtive to the whole volume, and then extracted with aqueous acid solution (e.g. pH 2, N/200HCl or N/200H$_2$SO$_4$) to obtain an aqueous acid solution containing the active ingredient.

The aqueous solution is subjected to the above-mentioned extraction with n-butanol. Thus-obtained n-butanol layer contains a high concentration of the Enduracidin produced in the mycelia. The extraction with aqueous hydrochloric acid solution and that with n-butanol are further repeated to obtain an n-butanol layer containing the active ingredient in much higher concentration. Thus-prepared n-butanol is concentrated, washed with water and further concentrated in vacuo at a low temperature.

To the concentrated n-butanol is added ether in an amount one-tenth as much in volume as the n-butanol to yield yellowish-brown precipitates which are collected by filtration. The precipitates are washed with ether to obtain crude active ingredient containing the greater part of the Enduracidin accumulated.

The crude substance shows antimicrobial activity of 5,000 to 10,000 units per milligram against *Staphylococcus aureus* and of 5,000 to 10,000 units per milligram against *Bacillus subtilis*.

In order to refine the crude substance, the following process is advantageous.

The crude substance dissolved in an aqueous acid solution is passed through a column packed with activated charcoal, which is previously treated with an acid, followed by being treated with weakly basic ion-exchange resin (e.g. Amberlite IR-4b, IR-45, etc.) to remove the acid. Thus treated solution is concentrated or freeze-dried (lyophilized) to obtain pure active ingredient.

Thus-obtained active ingredient is further subjected to purification or is changed into its hydrochloride by, for example, the following process. Namely, the active ingredient dissolved in a methanolic hydrochloric acid solution is passed through a column packed with activated charcoal, which is previously treated with an acid, and thus-treated solution is concentrated at room temperature. Acetone-ether is added to the concentrate, followed by allowing the concentrate to yield colorless crystalline powder of Enduracidin hydrochoride.

This powder is souble in water and methanol, and shows antimicrobial activity of 10,000 to 15,000 units per milligram against *Staphylococcus aureus* and of 10,000 to 15,000 units per milligram against *Bacillus subtilis*.

A 20 to 50% aqueous methanol solution of this powder is passed through a weakly basic ion-exchange resin, and to the effluent is added n-butanol, followed by distilling off water and methanol to give a concentrate.

Alternatively the aqueous solution of this powder is adjusted to pH 8 to 8.5, and then the thus-treated solution is extracted with n-butanol, followed by concentration to give a concentrate.

To the thus-obtained concenrtate is added ether to yield Enduracidin in its free form.

The physicochemical and biological properties of Enduracidin thus purified are as follows:

(1) Elementary analysis.—Enduracidin in free form consists of C, H, N, O and Cl atoms:

| | |
|---|---|
| C (percent) | 53.2±0.5 |
| H (percent) | 6.54±0.3 |
| N (percent) | 14.45±0.5 |
| Cl (percent) | 3.36±0.5 |

The free form still contains 3.36±0.5% chlorine atom in its molecule. This is considered to be due to strong ionic bonding or covalent bonding.

(2) Molecular weight and structural unit.—When Enduracidin is hydrolyzed with a 6 N-hydrochloric acid solution at 110° C. for 6 to 48 hours, a mixture of threonine, serine, glycine, alanine and aspartic acid, some ninhydrin-positive substances and undertermined substances though showing blue, violet-blue with Sakaguchi's reagent, are produced. These undetermined substances include those which show at first yellowish-brown, yellow or violet on ninhydrin reaction but these colors finally change into violet on continued standing at room temperature, and their amounts vary in accordance with the extent of hydrolysis.

From these characteristics, Enduracidin is regarded as a new basic peptide type antibiotic.

On the other hand, from a neutralizing titration curve of Enduracidin in a 50% methanol with a N/10 hydrochloric acid solution, it is understood that Enduracidin contains some dissociable basic groups in its molecule. And from the accounted amount of chlorine, the minimum molecular weight of Enduracidin may be calculated as about 1055, and therefore a molecular weight of Enduracidin may be shown as (about 1000 to 1100)$_n$, wherein $n$ is whole number.

(3) Specific rotation.—$[\alpha]_D^{23} = +85° \pm 10°$ (c.=0.5, in dimethylformamide).

Figure 4:
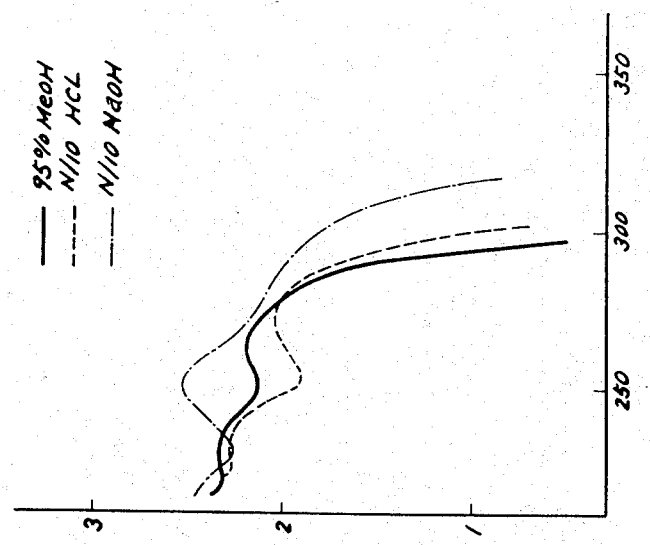

(4) Absorption spectrum.—The ultraviolet absorption of Enduracidin is as shown in FIG. 1 (free form) and FIG. 4 (hydrochloride form).

The significant maximum-absorptions observed on the free form are as follows:

$\lambda_{max.}^{95\% \text{ MeOH}}$ 230 m$\mu$ ($E_{1 \text{ cm.}}^{1\%} = 220 \pm 15$)

263 m$\mu$ ($E_{1 \text{ cm.}}^{1\%} = 150 \pm 10$)

$\lambda_{max.}^{N/10 HCl}$ 230 m$\mu$ ($E_{1 \text{ cm.}}^{1\%} = 195 \pm 10$)

272 m$\mu$ ($E_{1 \text{ cm.}}^{1\%} = 112 \pm 10$)

$\lambda_{max.}^{N/10 NaOH}$ 250 m$\mu$ ($E_{1 \text{ cm.}}^{1\%} = 335 \pm 10$)

Figure 2:
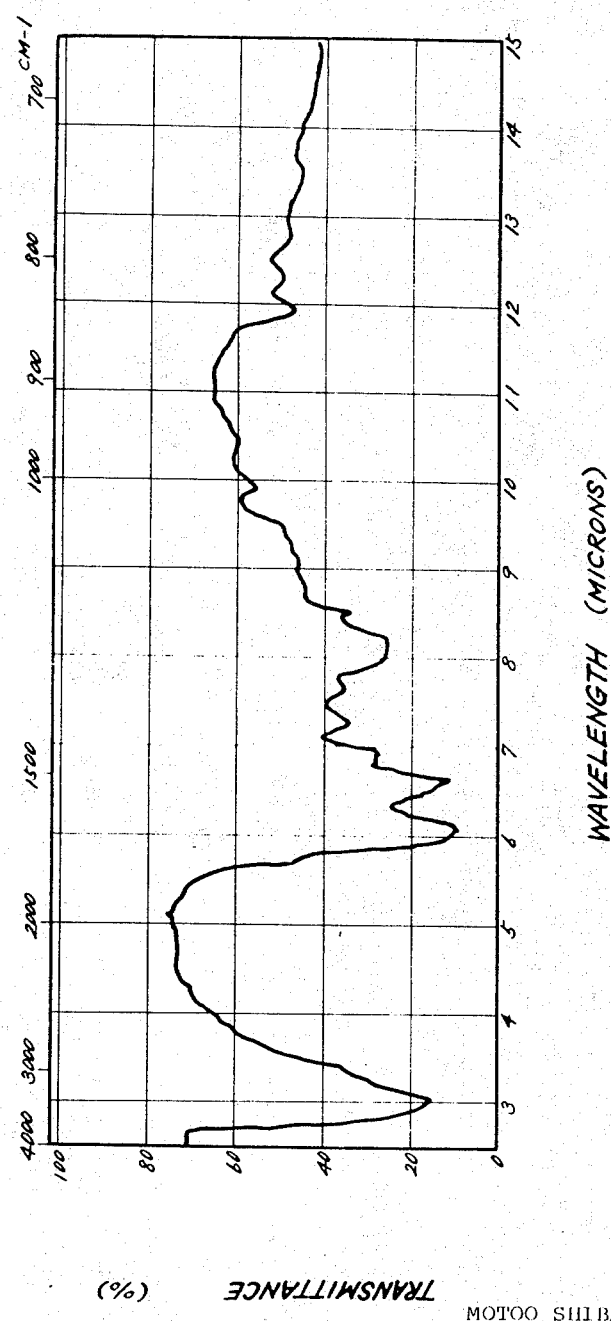
Figure 5:
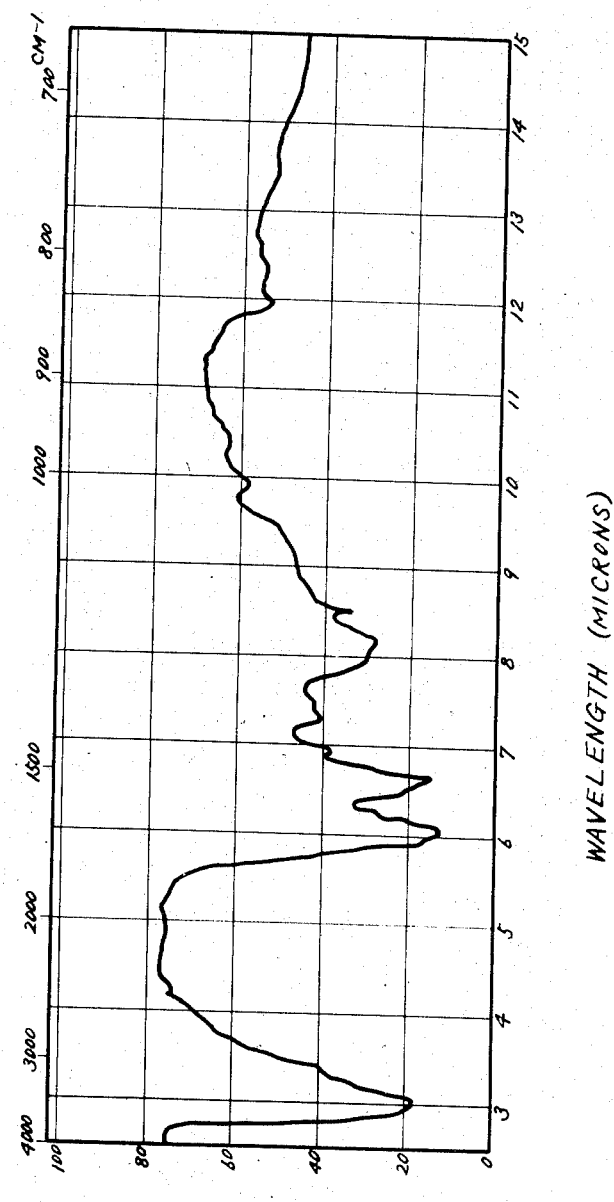
Figure 6:
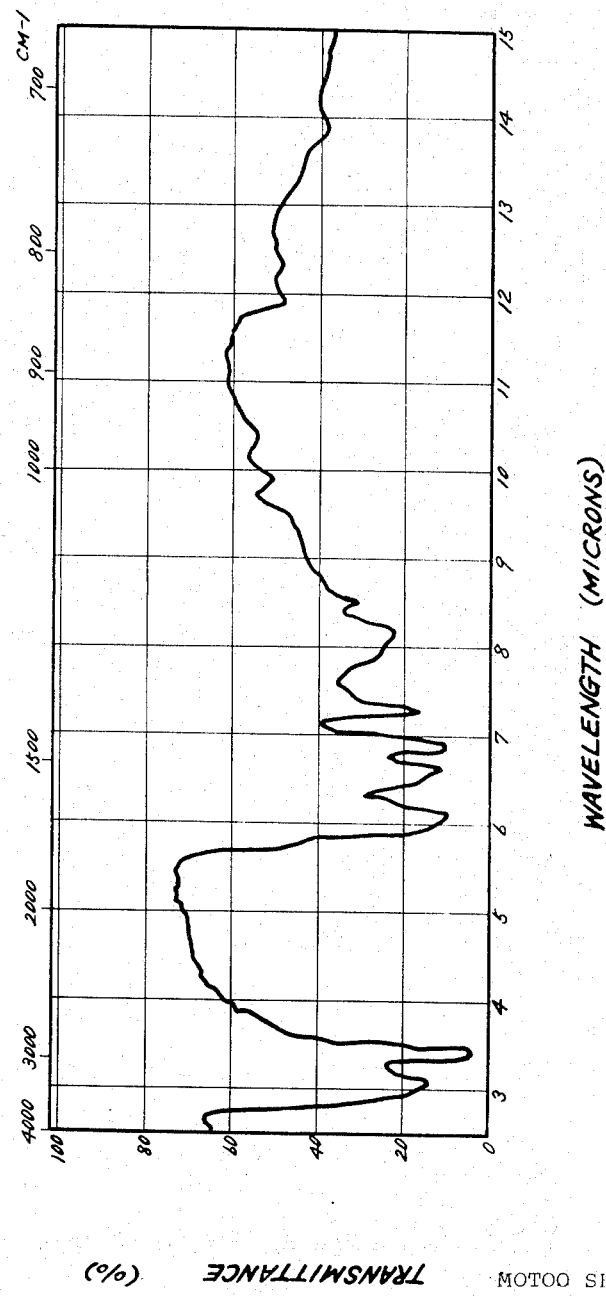

The infrared absorption spectrum of Enduracidin are as shown in FIG. 2 (free form, KBr-disk method) and FIG. 3 (free form, Nujol method), FIG. 5 (hydrochloride form, KBr-disk method) and FIG. 6 (hydrochoride form, Nujol method), respectively.

The significant absorption bands in microns on the free form are as follows:

| | |
|---|---|
| 3.05 (strong) | 6.90 (middle) |
| 3.25 (shoulder) | 7.23 (middle) |
| 3.38 (shoulder) | 7.63 (middle) |
| 5.75 (shoulder) | 8.10 (broad, strong) |
| 5.95 (shoulder) | 8.51 (middle) |
| 6.09 (strong) | 9.90 (middle) |
| 6.24 (shoulder) | 10.40 (weak) |
| 6.47 (shoulder) | 11.92 (middle) |
| 6.55 (shoulder) | 12.30 (weak) |
| 6.61 (strong) | 12.75 (very weak) |

(5) Color.—Colorless.

(6) Color reaction:

| Reagent: | Result |
|---|---|
| Ninhydrin reagent | Positive (pale-brownish violet). |
| Barton's reagent (a mixture of equal volume of 1% aqueous ferric chloride and 1% aqueous potassium ferricyanide) | Positive (pale-blue). |
| Dragendorff reagent | Positive (orangish-yellow). |
| Alkaline potassium permanganate | Discoloration occurs (reduction). |

(7) Melting point (free form).—205–225° C. (sintering); 225–240° C. (decomp.).

(8) Solubility.—Enduracidin (free form) is readily soluble in pyridine, dimethylformamide, 5% aqueous solution of polyethylene adduct of hydrogenated castor oil, dilute mineral acid e.g. dilute hydrochloric acid, aqueous alkaline solution (with decomposition), and soluble in aqueous methanol), aqueous ethanol, aqueous acetone and aqueous butanol, but insoluble or hardly soluble in water, absolute ethanol, pure butanol, pure acetone, etc.

(9) Rf value (paper partition chromatography).—Paper partition chromatograph measured by using ascending method on "Whatman filter paper No. 1" (W. and R. Balston Ltd., Great Britain) is as follows:

| Solvents: | Value in free form |
|---|---|
| Acetic acid/n-butanol/water (1:4:5) | [1] 0.45±0.1 |
| n-Butanol saturated with water | 0.0 |
| Pyridine/n-butanol/water (3:4:7) | 0.80±0.1 |

[1] The substance is easily adsorbed on filter paper under neutral conditions.

(10) Stability.—Enduracidin in free form is rather stable in methanol and an acid soluiton, but its antibacterial activity decreases to 1/5–1/10 on storing at 40° C. for 42 hours in an alkaline solution.

(11) Acute toxicity.—The medium lethal dose ($LD_{50}$) of Enduracidin in free form in mice is not less than 880 milligrams per kilogram of body weight when administered intraperitoneally and not less than 66 milligrams per kilogram of body weight when administered intravenously.

The medium lethal dose ($LD_{50}$) thereof in rats is not less than 300 milligrams per kilogram of body weight when administered intraveneously.

(12) Antibacterial spectra.—Antimicrobial activities of Enduracidin against various microorganisms are measured by means of agar dilution method.

Gram-positive and Gram-negative bacteria employed as the test organisms are incubated on bouillon agar at 37° C. for 20 hours.

For acid-fast bacteria, glycerine bouillon agar is used and incubation is carried out at 370 C. for 40 hours.

In the case of employing fungi or yeast, glucose bouillon agar is used as incubation medium and the incubation is carried out for 40 hours at 28° C.

The minimum inhibitory concentration of Enduracidin against the bacteria tested at 37° C. on TSA[1] culture containing beef blood serum for 20 hours is shown in Table 1.

TABLE 1

| Test bacteria | Minimum inhibitory concentration in free form mcg./ml.) |
|---|---|
| Staphylococcus aureaus 209p | 2.5 |
| Streptococcus pyogenes E-14 | 1.25 |
| Streptococcus pyogenes Dick | 1.25 |
| Streptococcus pyogenes S-8 | 1.25 |
| Streptococcus pyogenes Ni-5 | 2.5 |
| Streptococcus viridans sp. | 1.25 |
| Diplococcus pneumoniae I | 1.25 |
| Diplococcus pneumoniae II | 0.625 |
| Diplococcus pneumoniate III | 1.25 |
| Corynebacterium diphtheriae | 0.625 |

Antimicrobial spectrum of Enduracidin (minimum inhibitory concentration) is shown in Table 2, from which it is seen that Enduracidin shows strong antimicrobial activities against Gram-positive bacteria and acid fast bacteria.

TABLE 2

| Test bacteria: | Minimum inhibitory concentration ($\mu$g./ml.) |
|---|---|
| Escherichia coli | >100 |
| Proteus vulgaris | >100 |
| Staphylococcus aureus | 0.1 |
| Bacillus subtilis | 0.1 |
| Bacillus cereus | 0.5 |
| Bacillus brevis | 0.1 |
| Sarcina lutea | 0.2 |
| Micrococcus flavus | 0.05 |
| Mycobacterium avium | 5.0 |
| Mycobacterium avium (streptomycin-resistant) | 5.0 |
| Mycobacterium avium (neomycin-resistant) | 5.0 |
| Mycobacterium sp. ATCC 607 | 5.0 |
| Mycobacterium phlei | 5.0 |
| Mycobacterium smegmatis | 2 |
| Piricularia oryzae | >100 |
| Aspergillus niger | >100 |
| Candida albicans | >100 |
| Pencillium notalum | >100 |
| Saccharomyces cerevisiae | >100 |

Physiological acidity or basicity of Enduracidin is measured by the cross-streak agar disk method. The result is shown in Table 3, from which it is seen that Enduracidin shows stronger activities on basic assay media than on neutral or acid media, which means that Enduracidin is a so-called physiologically basic substance.

TABLE 3

[Difference of antimicrobial activities by pH-changes, of Enduracidin]

| Test bacteria | pH | Inhibitory zone (mm.) | |
|---|---|---|---|
| Bagillus subtilis | 6 | 11 | 11.5 |
| | 8 | 13 | 12 |
| Mygobacterium avium | 6 | 0 | 0 |
| | 8 | 0 | 0 |

Both Enduracidin and the hydrochloride thereof are useful in combating septic conditions in vitro and certain pathological disorder in vivo, in mammals. Thus, the new antibiotics can be used as disinfactants and preservatives, the disinfectant activity being utilizable for instance in asepticizing the air and utensils and the like, e.g. in hospital rooms, which may have been exposed to and contaminated by Gram-positive bacteria; thus, the air and the utensils can be sprayed with an effective quantity of e.g. an alcoholic solution of either of the antibiotics. The antibiotics of the invention are also useful, e.g. in the treatment of in vivo infections due to Gram-positive microorganisms (e.g. in the treatment of septicemia caused by staphylococci or streptococci). The antibiotic thus employed is administered non-orally, e.g. by intramuscular injection of a pharmaceutically acceptable solution thereof in a dosage of 1 to 2 mg. up to as much as 10 mg. of active ingredient per kilogram per day. The new compounds are also useful in the treatment of e.g. skin abscesses due to staphylococci or the like by topical application in analogous dosage of the active substance in for example a conventional ointment base or the like.

The following examples set forth presently-preferred exemplary embodiments of the present invention; these are solely illustrative, however, and not at all limitative of the invention.

In the present specification as well as in the following examples, the abbreviations $\mu$g., mg., g., kg., ml., l., and ° C. refer to microgram(s), milligram(s), gram(s), kilogram(s), milliliter(s), liter(s) and degrees centigrade, respectively, percentages are weight/volume percentages unless otherwise described.

EXAMPLE 1

*Streptomyces fungicidicus* No. B-5477 of one platinum loop taken from a glucose-asparagine agar slant is inoculated on 500 ml. each of aqueous culture media which are respectively placed in several 2 liter-flasks, the respective aqueous media containing 2% of glucose, 3% of starch, 1% of corn steep liquor, 1% of soybean flour, 0.5% of peptone, 0.3% of sodium chloride and 0.5% of calcium carbonate and being previously adjusted to pH 7 and sterilized at 120° C. for 20 minutes with high-pressure steam, then the respective culture media are incubated under shaking (120 r.p.m., 10 cm.) at 28° C. for 24 hours.

One liter of the resulting culture broth optionally collected from the flasks is pre-incubated in 30 l. of the culture medium of the same composition as above placed in a 50 liter-tank for 24 hours at 28° C. under stirring (280 r.p.m.) and aeration with a volume of 45 l./minute.

Thus-obtained pre-culture is further incubated for 96 hours at 28° C. in 500 l. of an aqueous culture medium containing 1% of glucose, 2% of starch, 1% of corn steep liquor, 1% of soy bean powder, 0.5% of peptone, 0.3% of sodium chloride and 0.5% of calcium carbonate placed in a 1000 l. vessel of stainless steel under stirring (160 r.p.m./minute) and aeration with a volume of 750 l./minute during the first-half of the cultivation and 500 l./minute during the latter half of the cultivation, while employing about 1.5 kg. of silicone oil as an antifoaming agent.

Changes of pH value and of antimicrobial activity in terms of agar dilution units as the lapse of the time of cultivation are shown in the following table:

| Cultivation period (hours) | pH | Culture filtrate (unit) | | Mycelia (unit) | |
|---|---|---|---|---|---|
| | | St [1] | B [2] | St [1] | B [2] |
| Sakaguchi's flask (seed) | 6.15 | | | | |
| Pre-culture (30 l.) | 7.05 | | | | |
| 0 | 7.05 | | | | |
| 18 | 6.28 | | | | |
| 24 | 6.70 | | | | |
| Main culture (500 l.) | 7.05 | | | | |
| 0 | 7.05 | | | | |
| 18 | 6.75 | | | | |
| 30 | 7.16 | >10 | >10 | >10 | 10 |
| 42 | 7.36 | >10 | >10 | 20 | 20 |
| 54 | 7.55 | 35 | 35 | 350 | 350 |
| 66 | 7.70 | 50 | 50 | 350 | 350 |
| 78 | 8.05 | 75 | 75 | 750 | 750 |
| 90 | 7.93 | 100 | 100 | 1,000 | 1,000 |

[1] *Staphylococcus aureus.*
[2] *Bacillus subtilis.*

EXAMPLE 2

One liter of the seed culture optionally collected from the flasks as in Example 1 is incubated in 30 l. of an aqueous culture medium containing 2% of glucose, 3% of starch, 1% of corn steep liquor, 1% of soybean flour, 0.5% of peptone, 0.3% of sodium chloride, 0.5% of calcium carbonate and 0.2% of sodium glutamate; then the ---
[1] TSA=trypticase soy agar.

culture medium is incubated at 28° C. for 96–120 hours under aeration (45 l./minute) and agitation (280 r.p.m.), while employing silicone oil as an antifoaming agent.

Change of pH value and of antimicrobial activity in terms of agar dilution units as lapse of the time of cultivation are shown in the following table:

| Cultivation period (hours) | pH | Culture filtrate (unit) | | Mycelia (unit) | |
|---|---|---|---|---|---|
| | | St[1] | B[2] | St[1] | B[2] |
| 0 | 7.25 | | | | |
| 18 | 6.95 | | | | |
| 30 | 6.81 | >10 | >10 | >10 | >10 |
| 42 | 7.00 | >10 | >10 | >10 | >10 |
| 54 | 7.30 | 35 | 20 | 150 | 150 |
| 66 | 7.52 | 35 | 20 | 150 | 150 |
| 78 | 7.62 | 35 | 35 | 350 | 350 |
| 90 | 7.59 | 500 | 500 | 1,500 | 1,500 |
| 102 | 7.70 | 500 | 500 | 2,000 | 2,000 |
| 114 | 7.90 | 500 | 500 | 2,000 | 2,000 |

[1] Staphylococcus aureus.
[2] Bacillus subtilis.

EXAMPLE 3

500 liters of the culture broth obtained in Example 1 is subjected to filtration to separate 100 kg. of wet mycelia from 400 l. of culture filtrate. The wet mycelia are subjected to extraction twice with 300 l. each of a 70% aqueous acetone under agitation for three hours. The acetone layers are combined showing (200–350 u./ml. against *St. aureus*) and adjusted to pH 5–6 with 4 N-sulfuric acid, from which acetone is evaporated off under reduced pressure to leave 200 l. of aqueous solution. The aqueous solution is adjusted to pH 3.0 with the addition of 4 N sulfuric acid. 70 l. of ethyl acetate is then added to the adjusted acidic solution, and the mixture is stirred, then left standing to form two layers. The ethyl acetate layer is removed and the aqueous layer (containing some precipitate) is taken out and adjusted to pH 8.0 with 4 N-sodium hydroxide, immediately followed by extraction twice with 90 l. each of n-butanol. The n-butanol solutions, showing 150–200 u./ml. against *Staphylococcus aureus*, are combined, and washed with 90 l. of distilled water. So-treated butanol solution is subjected to extraction twice with 50 l. each of N/200 hydrochloric acid. The respective hydrochloric acid solutions are combined and adjusted to pH 8.0 with 4 N-sodium hydroxide, immediately followed by subjecting to extraction twice with 50 l. each of n-butanol. The respective n-butanol layers are combined and washed with 50 l. of distilled water. So-combined and washed n-butanol layer is subjected to extraction twice with 15 l. each of N/200 hydrochloric acid. The hydrochloric aqueous layers are combined and adjusted to pH 8.0 with 4 N-sodium hydroxide, immediately followed by extraction twice with 15 l. each of n-butanol. The respective n-butanol layers are combined and washed twice with 10 l. each of distilled water. To so-treated n-butanol layer is added ¼ of its volume of distilled water, then the mixture is subjected to concentration under reduced pressure at an outside temperature not higher than 70° C. until the remaining volume becomes 200 ml. In the course of the concentration, precipitates of the product of this invention are observed. To the concentrate is added about 2 l. of ether (not containing peroxide), whereupon the resulting precipitates are collected by filtration together with the precipitates which were already formed. So-collected precipitates are washed with ether to obtain about 3.5 g. of crude powdery substance showing an antimicrobial activity of 5,000 u./mg. against *Staphylococcus aureus*.

To 400 l. of the culture filtrate referred to in the opening paragraph of this example is added 4 N-sulfuric acid to adjust its pH to 3.0, followed by addition of 150 l. of ethyl acetate. The mixture is stirred, and then it is left standing for a while to form two layers. The aqueous layer is taken out, and it is adjusted to pH 8.0 with 4 N-sodium hydroxide, immediately followed by the addition of 100 l. of n-butanol. The mixture is stirred, and then it is left standing for a while to form two layers. The n-butanol layer taken out is washed twice with distilled water, each time with ⅓ as much volume as the n-butanol layer.

To so-washed n-butanol layer is added distilled water in an amount ¼ the volume of the butanol layer. The mixture is subjected to concentration under reduced pressure at an outside temperature not higher than 70° C. The concentrates are subjected to similar processes to those which are applied to the wet mycelia referred to in the first paragraph of this example, whereby there is obtained about 0.5 g. of a crude powdery substance showing an antimicrobial activity of 5,000–7,500 u./mg. against *Staphylococcus aureus*.

EXAMPLE 4

100 liters of an acid solution containing active ingredient which is obtained by extracting with n-butanol in Example 3 is passed through a column packed with 1 kg. of activated charcoal for column chromatography, the column having previously been treated with hydrochloric acid, to obtain 70 l. of almost colorless fraction containing the active ingredient. The fraction is passed through a column packed with 2 l. of Amberlite IR–45 at S.V. 5 to obtain a slightly basic aqueous solution. The aqueous solution is concentrated at a relatively low temperature under reduced pressure. To the concentrate is added n-butanol, and the mixture is stirred to transfer the active ingredient to the n-butanol layer. To the n-butanol layer is added ether free from peroxide as in Example 3, whereby free form of the active ingredient precipitates out, or to the n-butanol layer is added N-hydrochloric acid to adjust its pH to 4.5, followed by concentration or freeze-drying, in the respective cases 1.8 g. of powdery substance showing antimicrobial activity of 7,500–10,000 u./mg. against *Staphylococcus aureus* and 1.9 g. of powdery substance showing antimicrobial activity of 7,500–10,000 u./mg. being obtained.

EXAMPLE 5

1 g. of crude powder substance prepared in the same manner as Example 3 or Example 4 is dissolved in a mixture of 500 ml. of methanol and 1 ml. of N-hydrochloric acid.

After the solution is passed through a column packed with 10 g. of activated charcoal for column chromatography and previously treated with a mixture of 4 ml. of N/10-hydrochloric acid and 100 ml. of methanol, the column is washed with methanol to obtain 1.5 l. of effluent containing active ingredient.

The effluent is concentrated in vacuo, followed by adding acetone-ether at a relatively low temperature, whereby white precipitates are obtained.

The precipitates are collected by filtration and washed with ether to obtain 500 mg. of precipitates (hydrochloride form) as colorless crystalline powder, which melts at 215° to 220° C. with sintering and decomposes at 235° to 245° C.

*Elementary analysis.*—C, 49.7±0.5%; H, 6.29±0.3%; N, 13.51±0.5%; Cl, 9.42±0.5%.

Ultraviolet absorption:

$$\lambda_{max.}^{95\% \text{ MeOH}} \ 230 \ m\mu \ (E_{1 \text{ cm.}}^{1\%} = 213 \pm 10)$$
$$263 \ m\mu \ (E_{1 \text{ cm.}}^{1\%} = 140 \pm 10)$$

The Enduracidin hydrochloride thus obtained is readily soluble in water, methanol, and soluble in ethanol, but insoluble in acetone or ether.

The hydrochloride shows antimicrobial activity of 15,000 units per mg. against *Staphylococcus aureus*.

On the other hand, 100 mg. of the hydrochloride form are dissolved in 100 ml. of 20% aqueous methanol, followed by passing through a column of 5 ml. of Amberlite IR–45 at S.V. 3.

The column is washed with methanol and the effluent is concentrated. The concentrate is freeze-dried (lyophilized), followed by washing with acetone-ether to obtain 80 mg. of white powder (free).

The precipitate shows antimicrobial activity of 15,000 units per mg. against *Staphylococcus aureus*.

EXAMPLE 6

After 16 liters of aqueous acetone extract (3500 u./ml. against *Staphylococcus aureus*) is adjusted to pH 8 to pH 8.4 with sodium hydroxide, there is added to the acetone layer 160 grams of activated charcoal and, as filter aid, 160 grams of pure diatomaceous earth (commercially available e.g. as Hyflow Super Cel) and the mixture is agitated for one hour. After filtration, the acivated charcoal is washed with the ten-fold volume of acetone relative to the filtrate and then with the ten-fold volume of methanol. Thus-treated activated charcoal is subjected twice to extraction with the 20-fold volume of acid aqueous acetone solution under agitation for three hours.

The extracts are combined and adjusted to pH 5, from which the solvent is evaporated off to leave 1.5 liters of an aqueous solution. The solution is passed through a column packed with 200 ml. of Amberlite IR-120 (H) and then through a second column packed with 200 ml. of Amberlite IR-45, and subjected to distillation to remove the solvent under reduced pressure. After mixing with 5 liters of water, the resultant solution is adjusted to pH 8.5 and extracted three times with one-third of its volume of n-butanol. The n-butanol layer is washed with water and concentrated under reduced pressure while adding water thereto to leave 500 ml. of the aqueous n-butanol solution. To the solution is added 5 liters of ether to yield precipitates which are filtered off and dried to give 4 g. of powdery crude Enduracidin.

Thus obtained crude Enduracidin shows about 10,000 u./mg. against *Staphylococcus aureus*.

The crude powdery Enduracidin is dissolved in a mixture of 80 ml. of 70% aqueous methanol and 1.6 ml. of N-hydrochloric acid under heating. The solution is treated with 200 mg. of activated charcoal while hot to obtain filtrate, and the filtrate is left standing at 5° C. overnight to give colorless prisms. The crystals are collected by filtration, washed with cool aqueous methanol, and dried under reduced pressure at 50° C. for 15 hours to obtain 2 g. of Enduracidin monohydrochloride, melting at 235° C. to 240° C. with sintering and decomposing at 240° to 245° C.

*Elementary analysis.*—C, 52.56%; H, 6.20%; N, 14.70%; Cl, 4.20%.

Ultraviolet absorption:

$\lambda_{max.}^{95\% \text{ MeOH}}$ 230 m$\mu$ ($E_{1\ cm.}^{1\%}$ 220±10)

263 m$\mu$ ($E_{1\ cm.}^{1\%}$ 152±10)

EXAMPLE 7

Into each of two 2-liter flasks is poured 500 ml. of a culture medium consisting of 2% glucose, 3.5% corn steep liquor, 1.5% calcium carbonate and water. The medium is inoculated with *Streptomyces fungicidicus* No. B-5477 mutant (IFO-12440) (ATCC—21014) and incubated at 28° C. for two days under shaking on a reciprocal shaker to prepare a pre-inoculation medium. In a 50 l. tank, 30 l. of an aqueous culture medium consisting of 2% glucose, 3% soluble starch, 1% corn steep liquor, 1% soybean flour, 0.3% sodium chloride, 0.5% peptone, 0.5% calcium carbonate and water and being adjusted to pH 7.0, is inoculated with the resulting pre-incubation broth, and the inoculated medium is incubated at 28° C. under agitation and aeration of 30 l. per minute. Progress of the incubation during 90 hours is as shown in the following table.

| Incubation period (hours) | pH of the broth | Potency of whole broth (dil.u./ml.) |
|---|---|---|
| 0 | 7.05 | <10 |
| 18 | 7.00 | <10 |
| 30 | 7.10 | <10 |
| 42 | 7.35 | 50 |
| 54 | 7.82 | 350 |
| 66 | 7.82 | 1,000 |
| 78 | 7.84 | 1,500 |
| 90 | 7.84 | 1,500 |

Having thus disclosed the invention, what is claimed is:

1. Enduracidin, having the following characteristics:
   (1) its elementary analysis is C, 53.2±0.5%; H, 6.54±0.3%; N, 14.45±0.5%; and Cl, 3.36±0.5%;
   (2) its minimum molecular weight calculated from the accounted amount of chlorine is about 1055 and therefore molecular weight of Enduracidin is shown as (about 1000 to 1100)$_n$ where $n$ is a whole number;
   (3) its specific rotation is $[\alpha]_D^{23}=+85° \pm10°$ C.=0.5, in dimethylformamide);
   (4) its melting point is 205–225° C. with sintering and decomposition at 225–240° C.;
   (5) its ultraviolet absorption spectrum is as shown on FIG. 1 of the accompanying drawings, and the significant maximum absorptions are as follows;

$\lambda_{max.}^{95\% \text{ MeOH}}$ 230 m$\mu$ ($E_{1\ cm.}^{1\%}=220\pm15$)

263 m$\mu$ ($E_{1\ cm.}^{1\%}=150\pm10$)

$\lambda_{max.}^{N/10 \text{ HCl}}$ 230 m$\mu$ ($E_{1\ cm.}^{1\%}=195\pm10$)

272 m$\mu$ ($E_{1\ cm.}^{1\%}=112\pm10$)

$\lambda_{max.}^{N/10 \text{ NaOH}}$ 250 m$\mu$ ($E_{1\ cm.}^{1\%}=335\pm10$)

(6) its infrared absorption spectrum is as shown on FIGS. 2 and 3 of the accompanying drawings, and the significant absorption bands in microns are as follows:

(KBr-method)

| | |
   |---|---|
   | 3.05 (strong) | 6.90 (middle) |
   | 3.25 (shoulder) | 7.23 (middle) |
   | 3.38 (shoulder) | 7.63 (middle) |
   | 5.75 (shoulder) | 8.10 (broad, strong) |
   | 5.95 (shoulder) | 8.51 (middle) |
   | 6.09 (strong) | 9.90 (middle) |
   | 6.24 (shoulder | 10.40 (weak) |
   | 6.47 (shoulder) | 11.92 (middle) |
   | 6.55 (shoulder) | 12.30 (weak) |
   | 6.61 (strong) | 12.75 (very weak) |

(7) it is positive to Ninhydrin reagent, Barton's reagent and Dragendorff reagent;
   (8) it is discolored by alkaline potassium permanganate;
   (9) it is readily soluble in pyridine, dimethylformamide, dilute mineral acid, aqueous alkaline solution (with decomposition), and soluble in aqueous methanol, aqueous ethanol, aqueous acetone and aqueous butanol, but insoluble or difficultly soluble in water, absolute ethanol, pure butanol and pure acetone;
   (10) its Rf values obtained by paper partition chromatography measured by using the ascending method on "Whatman filter paper No. 1" are as follows:

Solvent:                          Rf value

Acetic acid/n-butanol/water (1:4:5)     0.45±0.1 n-Butanol saturated with water       0.0

Pyridine/n-butanol/water (3:4:7)    0.80±0.1

(11) it shows antimicrobial activity selectively against Gram-positive bacteria and acid fast bacteria; or a pharmaceutically acceptable salt thereof.

2. A pharmaceutically acceptable hydrochloride salt of Enduracidin as claimed in claim 1.

3. A hydrochloride salt according to claim 2 wherein the chlorine content is about 9.42±0.5%.

4. A hydrochloride salt according to claim 2 wherein the chlorine content is about 4.20±0.5%.

5. A method for producing Enduracidin, which comprises culturing *Streptomyces fungicidicus* No. B–5477 (ATCC—21013) or (ATCC—21014) in a nutrient medium containing assimilable carbon sources and digestible nitrogen sources at a temperature of about 24 to 43° C. for 40 to 180 hours under aerobic conditions until Enduracidin is substantially accumulated in the culture broth, and recovering the accumulated Enduracidin therefrom.

References Cited

Derwent Farmdoc 26,732, abstracting South African Pat. No. 66/6,073, published Mar. 15, 1967.

JEROME D. GOLDBERG, Primary Examiner

U.S. Cl. X.R.

195—80